United States Patent [19]

Watt et al.

[11] Patent Number: 4,660,842
[45] Date of Patent: Apr. 28, 1987

[54] AGRICULTURAL IMPLEMENT WITH ELEVATION CONTROL MECHANISM

[75] Inventors: Dwayne B. Watt, Woodridge; Brad K. Eversole, Bollingbrook, both of Ill.

[73] Assignee: J. I. Case Company, Racine, Wis.

[21] Appl. No.: 855,800

[22] Filed: Apr. 24, 1986

[51] Int. Cl.⁴ ............................................. A01B 63/22
[52] U.S. Cl. .................... 280/43.23; 172/413
[58] Field of Search ............... 172/413, 421, 400, 401, 172/423, 429; 280/43.23

[56] References Cited

U.S. PATENT DOCUMENTS

| | | | |
|---|---|---|---|
| 2,699,715 | 1/1955 | Shelton | 172/413 X |
| 3,870,107 | 3/1975 | Orthman | 172/421 X |
| 4,406,329 | 9/1983 | Schlueter | 172/413 X |
| 4,451,052 | 5/1984 | Gagelin | 280/43.23 |

*Primary Examiner*—Richard T. Stouffer
*Attorney, Agent, or Firm*—Dressler, Goldsmith, Shore, Sutker & Milnamow, Ltd.

[57] ABSTRACT

An elevation control mechanism is provided for an agricultural implement. A first lever is pivotally mounted to the implement frame about a pivot axis for oscillation relative to the frame. The first lever carries a ground engaging wheel. A second lever is pivotally mounted to the frame about a pivot axis for oscillation relative to the frame. An extendable and retractable pressure fluid actuator is pivotally connected between the first and second levers for effecting relative movement between the levers to raise and lower the frame relative to the ground. An adjusting arrangement is carried by the frame and connected to the second lever for pivoting the second lever to a selected orientation relative to the frame so as to locate the actuator at a selected position relative to the frame.

4 Claims, 3 Drawing Figures

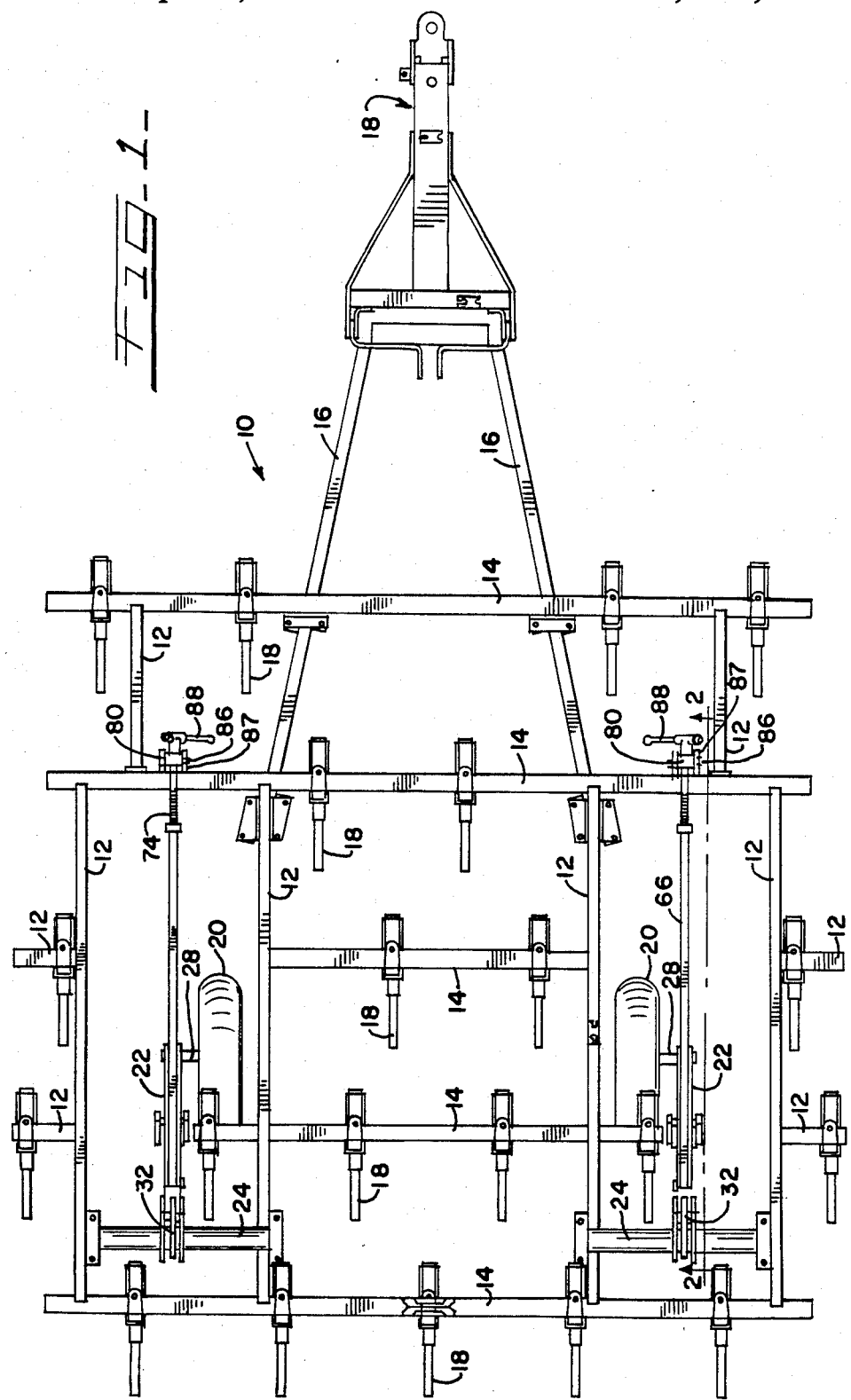

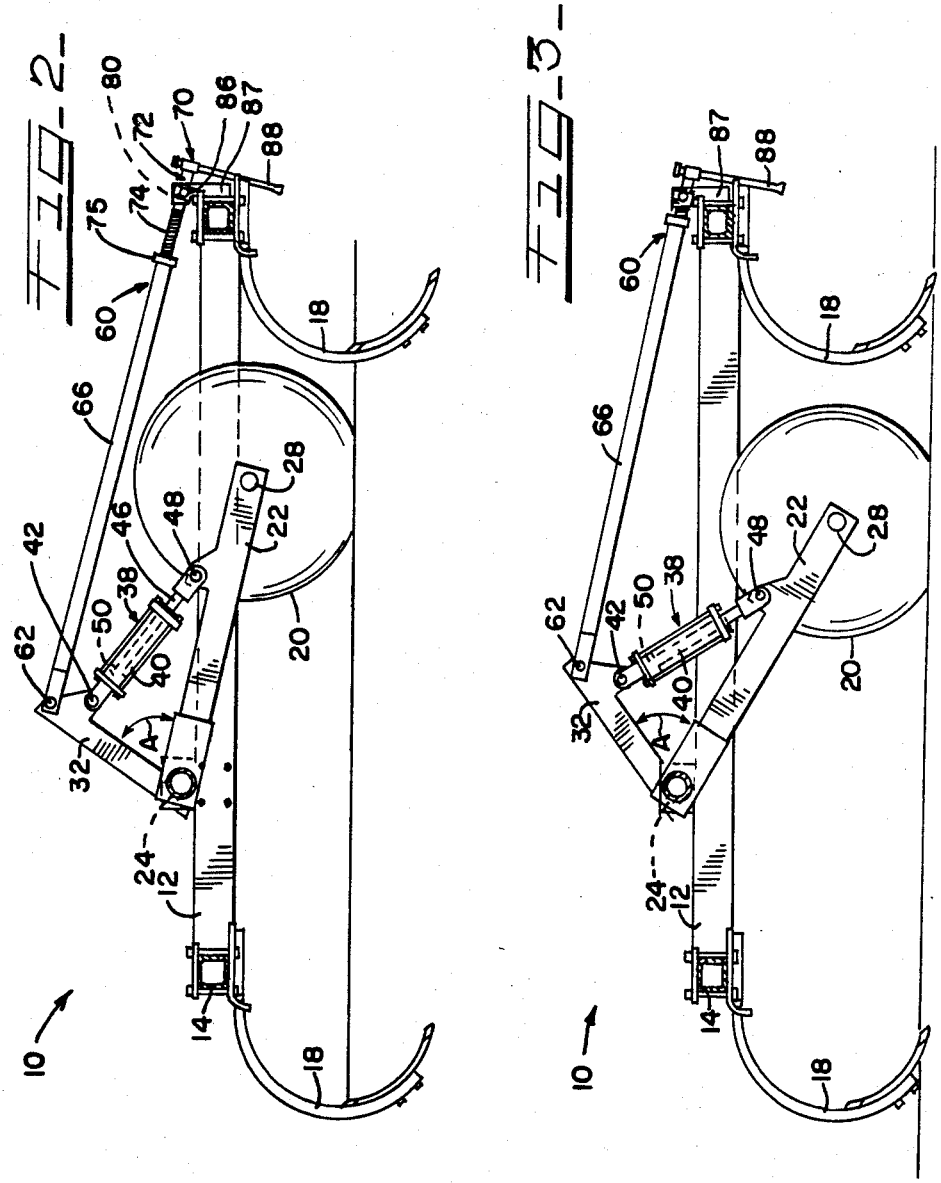

AGRICULTURAL IMPLEMENT WITH ELEVATION CONTROL MECHANISM

TECHNICAL FIELD

This invention relates to agricultural implements of the type that have a frame supported above the ground by one or more wheels and which have one or more instrumentalities for effecting soil-related operations at a particular depth in the soil or at a particular elevation above the soil. Such an implement may be part of a self-propelled machine or may be towed by another machine, such as a tractor or the like.

BACKGROUND OF THE INVENTION

A variety of agricultural implements typically incorporate a frame wherein the frame height above the ground can be adjusted by an elevation control mechanism. When the frame carries instrumentalities for penetrating the soil, this mechanism functions as a "depth control" mechanism. To this end, it is common to mount one or more wheels of the implement on an axle carried on a lever which is pivotally mounted to the frame. The lever can be set at any desired angle relative to the frame to establish the desired height of the frame above the ground. Typically, the orientation of the lever relative to the frame is established by means of an hydraulic piston-cylinder actuator that is connected at one end to the frame and at the other end to the lever on which the wheel axle is carried. With the above-described type of hydraulic actuator system, it is usually desired to maintain the selected frame elevation for the duration of the particular agricultural work being done—until a greater or lesser elevation is desired because of changing ground conditions or until it is desired to raise the frame to the highest possible elevation for road transport.

One conventional approach to maintaining a selected frame elevation with an hydraulic piston-cylinder actuator system involves the use of a locking collar on the actuator piston rod. The collar is adjusted to limit the stroke depth at the desired frame elevation. However, this requires that the operator leave the operating seat on the machine and physically adjust the locking collar or collars. Further, there are usually at least two piston-cylinder actuators, and the collar on each piston rod must be carefully positioned so that, at the selected frame elevation, the frame is level and not subjected to torsion.

In another conventional system for setting the frame elevation, a more expensive mechanism is provided in the form of a stop valve to control the actuator piston stroke. However, with this type of system, internal leakage can occur. The actuator piston then begins to move from its initially set position as the fluid leaks from the high pressure side of the hydraulic system to the low pressure side. This results in a change of the elevation of the frame.

It would be desirable to provide an improved mechanism for setting the elevation of an implement frame which could be easily adjusted and could maintain the selected elevation of the implement frame for a sustained period of time. It would also be beneficial if such an improved mechanism could be employed with a relatively wide implement frame having a plurality of hydraulic piston-cylinder actuators and could be employed in such a manner so as to more easily maintain the implement frame level at any selected elevation.

SUMMARY OF THE INVENTION

An elevation control mechanism is provided for an agricultural implement having a frame and at least one ground engaging wheel for supporting the frame above the ground. A first lever is pivotally mounted to the frame about a pivot axis for oscillation relative to the frame, and the wheel is carried by the first lever. A second lever is also pivotally mounted to the frame about a pivot axis for oscillation relative to the frame. An extendable and retractable pressure fluid actuator is pivotally connected between the first and second levers for effecting relative movement between the levers to raise and lower the frame relative to the ground. An adjusting means is carried by the frame and is connected to the second lever for pivoting the second lever to a selected orientation relative to the frame so as to locate the actuator at a select position relative to the frame.

Numerous other features, as well as the advantages, of the present invention will become readily apparent from the following detailed description of the invention, from the claims, and from the accompanying drawings.

BRIEF DESCRIPTION OF THE DRAWINGS

In the accompanying drawings forming part of the specification, in whch like numerals are employed to designate like parts throughout the same, FIG. 1 is a simplified plan view of an implement embodying the present invention;

FIG. 2 is a greatly enlarged, fragmentary, cross-sectional view taken generally along the plane 2—2 in FIG. 1; and FIG. 3 is a view similar to FIG. 2, but showing the implement frame at a greater elevation above the ground.

DESCRIPTION OF THE PREFERRED EMBODIMENT

The figures illustrate one preferred embodiment of the apparatus and show conventional structural details and mechanical elements that will be recognized by one skilled in the art. However, the detailed descriptions of all such elements are not necessary to an understanding of the invention, and accordingly are not herein presented.

In the accompanying drawings, an agricultural implement is generally indicated by reference numeral 10 and includes a frame assembly comprising a plurality of longitudinally extending members or frames 12 which are connected to a plurality of transversely extending members or frames 14. The implement 10 includes angled members 16 connecting the frames 12 and 14 to a suitable conventional hitch 18 which may be connected to a towing machine, such as a tractor or the like (not illustrated).

The agricultural implement 10 is not herein disclosed as having a specific function, and it is anticipated that a variety of operating instrumentalities, such as seed planting or cultivating apparatus, may be mounted to the implement 10. For illustrative purposes, the implement 10 is shown provided with a plurality of soil-engaging members 18 of a particular conventional type.

The implement 10 includes ground engaging wheels 20. Each wheel 20 is mounted for rotation on a shaft 28 which is carried by a first lever 22 and which defines a rotational axis for the wheel 20. The first lever 22 is pivotally mounted on a shaft 24 on the frame 12. The first lever 22 can thus oscillate or swing about the shaft 24 to vary the height of the wheel 20 relative to the frame 12.

According to the present invention, a second lever 32 is pivotally mounted to the frame 12. In the embodiment illustrated, the second lever 32 is pivotally mounted about the shaft 24 so that the second lever 32 is carried by the frame 12 about a pivot axis which is colinear with the pivot axis about which the first lever 22 is mounted to the frame 12.

The implement 10 includes an extendable and retractable pressure fluid actuator, such as a double-acting hydraulic piston-cylinder actuator 38. The actuator 38 has a cylinder 40 which is pivotally connected at one end about a pin 42 to the second lever 32 and has a piston rod 46 which is pivotally connected at one end to the first lever 22 by means of a pin 48. The actuator 38 includes a piston 50 which is illustrated in FIGS. 2 and 3 in dashed lines and is shown bottomed out at one end of the cylinder 40. For convenience of illustration, the conventional hydraulic fluid hose connections at each end of the cylinder 40 have been omitted along with the other conventional hydraulic system components.

Associated with each wheel 20 is an adjusting means 60 as illustrated in FIG. 1. Each adjusting means 60 is carried by the frame 12 and is pivotally connected to the second lever 32 by means of a pin 62. The adjusting means 60 is provided for pivoting the second lever 32 to a selected orientation relative to the frame 12 so as to locate the actuator 38 at a selected position relative to the frame 12. To this end, any suitable adjusting means 60 may be employed to move the lever 32 and maintain the lever 32 at the desired orientation. In the embodiment illustrated, the adjusting means 60 includes a number of coacting components, one of which is an elongated link 66 that is connected by the pin 62 to the second lever 32. The link 66 includes a member 76 which defines an internally threaded bore (not visible in the figures). The adjusting means 60 also includes a drive means 70 mounted on the frame 12 and engaged with the link 66 for moving the link 66 relative to the frame 12. Any suitable drive means 70 may be employed for effecting movement of the link 66. In the illustrated embodiment, the drive means 70 includes an adjusting member 72 which has a threaded portion 74 that is threadingly engaged with the threaded bore of the link member 76.

The drive means 70 also includes a collar means 80 for receiving the adjusting member 72. The adjusting member 72 and the collar means 80 define appropriate conventional shoulder and thrust bearing surfaces (not visible in the figures) which prevent axial movement of the adjusting member 72 relative to the collar means 80 while accommodating the rotation of the adjusting member 72 in either direction within the collar means 80. The drive means 70 also includes mounting means, such as a pin 86, for pivotally mounting the collar means 80 to a plate 87 on the frame 12 for swiveling movement in a plane of oscillation parallel to the planes of oscillation of the first and second levers 22 and 32, respectively. This permits the adjusting member 72 and connected link 66 to assume any angular orientation relative to the frame 12 that might be required in response to the orientation of the second lever 32.

The drive means 70 also preferably includes a handle 88 which may be turned by the operator to rotate the adjusting member 72 so as to screw the link 66 away from or toward the collar means 80, depending upon the direction of rotation of the adjusting member 72.

The above-described arrangement provides an infinite number of frame elevation settings throughout a working range. When operated to maintain the frame 12 at a desired elevation, the actuator cylinder 38 is pressurized to fully retract the piston 50 against the end of the cylinder 38. The desired working elevation of the frame 12 is then set with the adjusting means 60 by rotating the handle 88 in the direction necessary, and for the number of revolutions necessary, to pivot the second lever 32 so as to move the actuator 38, the first lever 22, and the wheel 20 to a selected position relative to the frame 12 that establishes the desired elevation of the frame 12. The actuator piston 50 remains pressurized to the end of its stroke at the end of the cylinder 38. Thus, the actuator 38 functions essentially as a rigid member (under compression loading in the illustrated embodiment). This eliminates the possibility that a change in the elevation of the frame 12 relative to the ground could be caused by slippage of the actuator components or actuator pressure fluid leakage.

Taken together, FIGS. 2 and 3 illustrate different elevation settings of the frame 12 with respect to the ground. In both FIGS. 2 and 3 the fully retracted adjusting means 60 maintains the first lever 22 at an angle A relative to the second lever 32. In both cases, the actuator piston 50 is pressurized to the end of its stroke at the end of the actuator cylinder 38, and the length dimension of the fully retracted actuator 38 is the same. The frame 12 is higher in FIG. 3 than in FIG. 2 because in FIG. 3 the adjusting means 60 has been adjusted to effect a lowering of the second link 32, actuator 38, and first link 22. This raises the frame 12.

For a given design, the working range of elevation adjustability depends, of course, upon the relationship between the lengths of the first and second levers and the amount of adjusting thread length provided in the adjusting means.

Where the adjusting means 60 includes threaded adjusting components (such as in the preferred embodiment illustrated) and where more than one such adjusting means 60 is employed on an agricultural implement, special means may be easily provided for accommodating uniform adjustment. To this end, suitable gauge markings or scales (not illustrated) may be provided in association with the threaded adjusting components so that each threaded adjusting component (e.g., member 72) can be set to the same gauge setting. This will prevent unequal height adjustments across the width of the implement that would undesirably twist the implement.

It is to be noted that the novel elevation control mechanism of the present invention permits the soil engaging instrumentalities 18 to be raised above the ground by the actuators 38. To this end, each actuator 38 can be pressurized so that the piston 50 moves the rod 46 to the fully extended position (not illustrated). This causes relative pivoting movement between the first lever 22 and second lever 32 so that the included angle A increases. It is to be noted that the wheels 20 are always in contact with the ground and that the second lever 32 is restrained from pivoting by the link 66 at any given setting. Thus, the entire frame 12 is elevated as the first lever 22 approaches a more vertical orientation and increases the angle A between the first and second levers. The actuator stroke length and the points of actuator attachment to the levers 22 and 32 are designed so that, at the maximum extension of the actuator, the soil engaging instrumentalities 18 can be raised from any working elevation in the adjustable range to a greater elevation that is sufficiently above the ground surface to accommodate normal road transport.

It will be readily observed from the foregoing detailed description of the invention and from the illustrated embodiment thereof that numerous variations and modifications may be effected without departing from the true spirit and scope of the novel concepts or principles of this invention. The scope of the invention is pointed out in the appended claims.

What is claimed is:

1. An agricultural implement having a frame and at least one ground engaging wheel for supporting said frame above the ground and an elevation control mechanism therefor, said mechanism comprising:
    a first lever pivotally mounted to said frame about a pivot axis for oscillation relative to said frame with said wheel carried on the forward end of said first lever for rotation about a rotational axis parallel to, and spaced from, said pivot axis;
    a second lever pivotally mounted to said frame about a pivot axis at the rearward end of said first lever for oscillation relative to said frame;
    an extendable and retractable pressure fluid actuator pivotally connected between said first and second levers for effecting relative movement between said levers for raising and lowering said frame relative to the ground;
    an adjusting member that has a threaded portion and that is carried on said frame forwardly of said first lever and said second lever for accommodating rotation about the thread axis as well as pivoting movement relative to said frame; and
    an elongated link that is pivotally connected to said second lever and that extends forwardly therefrom and is threadingly engaged with said adjusting member threaded portion whereby rotation of said adjusting member moves said link to pivot said second lever to a selected orientation relative to said frame so as to locate said actuator at a selected position relative to said frame, said elongated link being subjected to tensile loading attendant to support of said frame of said implement by said ground engaging wheel.

2. The mechanism in accordance with claim 1 in which said first lever pivot axis is colinear with the pivot axis about which said second lever is mounted to said frame.

3. The mechanism in accordance with claim 1 in which said actuator is a double acting piston-cylinder actuator.

4. The mechanism in accordance with claim 1 in which one end of said actuator is connected to said second lever intermediate said second lever pivot axis and the connection of said second lever to said elongated link.

* * * * *